(12) United States Patent
De La Maza Uriarte

(10) Patent No.: US 8,921,788 B1
(45) Date of Patent: Dec. 30, 2014

(54) LASER SENSOR WITH INTEGRATED ROTATING MECHANISM

(71) Applicant: Unimetrik, S.A., Legutiano (ES)

(72) Inventor: Borja De La Maza Uriarte, Getxo (ES)

(73) Assignee: Unimetrik, S.A., Legutiano (ES)

( * ) Notice: Subject to any disclaimer, the term of this patent is extended or adjusted under 35 U.S.C. 154(b) by 35 days.

(21) Appl. No.: 13/957,024

(22) Filed: Aug. 1, 2013

Related U.S. Application Data

(63) Continuation of application No. PCT/ES2013/070436, filed on Jun. 28, 2013.

(51) Int. Cl.
*G02B 26/10* (2006.01)
*F16H 19/00* (2006.01)

(52) U.S. Cl.
CPC .................................... *F16H 19/001* (2013.01)
USPC .......................................................... 250/334

(58) Field of Classification Search
CPC ......................................................... G01J 3/02
USPC .................................. 250/339.02
See application file for complete search history.

(56) References Cited

U.S. PATENT DOCUMENTS

| | | |
|---|---|---|
| 5,084,981 A | 2/1992 | McMurtry et al. |
| RE35,510 E | 5/1997 | McMurtry |
| 5,735,180 A | 4/1998 | McMurtry |
| 5,806,200 A | 9/1998 | Brenner et al. |
| 6,854,195 B2 | 2/2005 | Jordil et al. |
| 7,213,344 B2 | 5/2007 | Jordil et al. |
| 7,281,433 B2 | 10/2007 | Jordil et al. |
| 7,415,775 B2 | 8/2008 | Jordil et al. |
| 2010/0030380 A1* | 2/2010 | Shah et al. ................. 700/258 |

FOREIGN PATENT DOCUMENTS

| | | |
|---|---|---|
| CN | 202304767 | 7/2012 |
| GB | 2335274 | 9/1999 |
| WO | WO 2009/106833 | 9/2009 |

* cited by examiner

*Primary Examiner* — David Porta
*Assistant Examiner* — Hugh H Maupin
(74) *Attorney, Agent, or Firm* — Notaro, Michalos & Zaccaria P.C.

(57) ABSTRACT

Laser sensor with integrated rotating mechanism has a camera, a laser, and a chassis configured to rotate on its own axis, which has an indexed rotating mechanism which includes, in turn: a motorized set made up of a rotating motor positioned on an axis parallel to the rotating axis, and connected to this rotating axis by gears, and a motorized set made up of a locking motor housed inside the axis on a support; and in which the bottom of the support includes locking rollers and a ring coupled to this support in such a way that locking occurs as a result of contact between balls housed in the chassis and the rollers adjacent to the bottom of the support.

7 Claims, 2 Drawing Sheets

LASER SENSOR WITH INTEGRATED ROTATING MECHANISM

RELATED APPLICATION

This application is a continuation of International Patent Application No. PCT/ES2013/070436, filed Jun. 28, 2013, which is incorporated here by reference and which priority claim is repeated herein.

DESCRIPTION

The object of this invention is a laser sensor with integrated rotating mechanism, the principal function of which is to allow it to rotate on its own axis in a precise manner, to achieve and maintain the most appropriate orientation for 3D scanning of areas on the surface of a part to be analysed, which it has not been possible to scan until now.

STATE OF THE ART

The use of 3D scanners is well-known in the field of precision measurement: they function by projecting a laser light to obtain a series of images using a camera, which is positioned around the part to be measured by means of an indexed rotating movement. To reach all the possible points when scanning a surface, the scanner must be mounted on the end of a machine formed of a series of arms connected by moving or rotating elements, which allow the scanner to be moved to all possible points of the surface to be measured. The 3D laser sensor must be positioned using these articulated elements, in such a way that it keeps a certain orientation with regard to the line followed when scanning surfaces, so that it can reach areas difficult to access with no need to move the part, the machine or other components.

An example of this is U.S. Pat. No. RE35,510, which describes a probe head acting in a radial direction which allows it to be rotated to different indexed positions thanks to engagement between a set of balls and rollers.

U.S. Pat. No. 5,735,180 refers to two bodies which can be rotated in relation to each other to achieve different angular positions, thanks to the fact that the rollers in one of the bodies fit into the clefts of the other body, with a need for them to be separated axially to perform this rotation. Patent WO2009106833A2 consists of two parts which rotate in relation to each other in angular positions, thanks to the fact that the different couplings in each of them fit together. U.S. Pat. No. 5,084,981 refers to an indexing mechanism which allows a body to be rotated in relation to another, with an intermediate body which can rotate freely in relation to the other two. Between all the bodies there is a set of elements allowing the bodies to be engaged in different positions, which may be gear teeth or convergent surfaces (spheres) which fit with a group of 3 or more elements, such as rollers. It may have one or two motors which use gears to allow rotation of the bodies to the necessary positions. U.S. Pat. No. 5,806,200 refers to a probe head with two longitudinal axes, the second of which may be adjusted to different fixed angles. U.S. Pat. No. 6,854,195B2, U.S. Pat. No. 7,213,344B2, U.S. Pat. No. 7,281,433B2 and U.S. Pat. No. 7,415,775B2 refer to probe heads with different rotation angles.

Finally, the applicant is aware of the existence of document CN202304767U, which describes a three-dimensional profile measuring device based on multiple sensors. It comprises a base plate, a vertically moving platform, a work surface and optical measuring components. Each optical measuring component comprises a laser, a camera and a camera support. The visual field and the magnifications to be used are adjusted according to the characteristics of the shape of the surface of the part to be measured, and the three-dimensional measuring device is suitable for measuring complex curved surfaces of blades, bevel gears and the like, which cannot be measured effectively using the traditional method.

This document differs from the aforementioned Chinese document in that it is based on the inclusion of certain means which allow the laser sensor to be positioned in such a way that the necessary orientation is maintained to facilitate 3D scanning; effective scanning was not possible previously because of the geometry of the part.

Meanwhile, document GB2335274 describes an indexing mechanism to activate the discrete angular displacement of a first body relative to a second body; this differs from the invention advocated here, which includes a different structure comprising the support and at least one ring, the principal advantage of which is to increase the repeatability in the locking, a problem which the aforementioned English document does not solve.

DESCRIPTION OF THE INVENTION

The technical problem solved by this invention is that of managing to position a 3D laser sensor in such a way that it maintains a certain orientation for scanning areas which are difficult to access, with no need to move the part being analysed or other components used in this procedure. To do so, the laser sensor with integrated rotating mechanism, the object of this invention, is characterised essentially in that it comprises a 3D laser sensor formed of a laser emitter and a receiving camera positioned on a chassis at a suitable angle to capture the image of the parts to be measured. In addition, this chassis is coupled to a coordinate measuring machine, with a motorised arm, or any other articulated element which positions the sensor in different positions in relation to the part to be scanned.

The integrated rotating mechanism is configured to allow the chassis to rotate on its own axis. The rotating mechanism comprises two motors, a coder and a fixing or coupling mechanism. The basic element of the first motor is a motor located on an axis parallel to the rotating axis, which transmits to the sensor a rotating movement in relation to this rotating axis. The basic element of the second motorised element is a locking motor, positioned inside the rotating axis and configured to lock and unlock the chassis.

Finally, inside the chassis there is a set of rollers and balls which allow the chassis to be placed in different angular positions exactly and with high repeatability. Thanks to the locking motor, these rollers and balls can be separated and fitted together, to lock and unlock the chassis.

Thanks to its special design, the sensor advocated here allows and makes compatible the use of simpler articulated elements, as the sensor itself provides additional rotation which keeps the scanner correctly oriented to facilitate 3D scanning, enabling the scanning of areas which the geometry of the part made inaccessible for effective scanning.

Throughout the description and the claims, the word "comprises" and variants thereof are not intended to exclude other technical characteristics, additions, components or steps. For experts in the subject, other objects, advantages and characteristics of the invention will be gleaned in part from the description and in part from the practice of the invention. The following examples and drawings are provided for illustrative purposes, and are not intended as a restriction on this invention. In addition, this invention covers all the possible combinations of particular and preferred embodiments indicated here.

BRIEF DESCRIPTION OF THE FIGURES

Below is a very brief description of a series of drawings which help to understand the invention better and which are expressly related to an embodiment of said invention presented as a non-restrictive example thereof.

PREFERRED EMBODIMENT OF THE INVENTION

Figure 1:
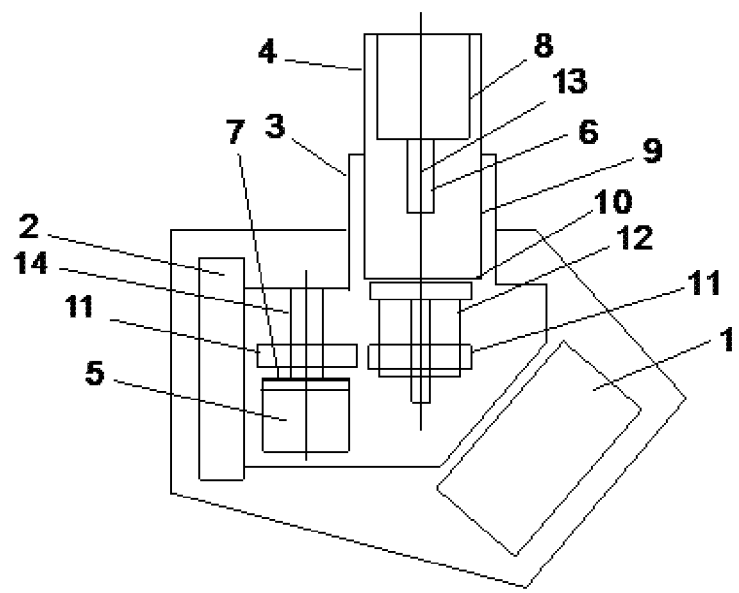
FIG. 1. Shows a first cross-sectional view of the sensor advocated here.
Figure 2:
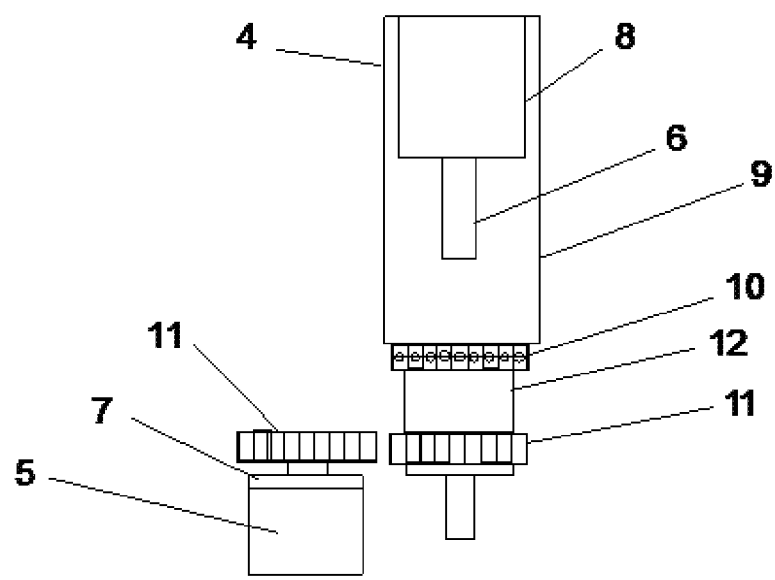
FIG. 2. Shows a second profile view of the mechanism which forms part of the sensor, the object of this invention.

The attached figures show a preferred embodiment of the invention. More specifically, the laser sensor with integrated rotating mechanism, the object of this invention, is characterised essentially in that it comprises a first indexed rotating mechanism, connected to an image capturing device or camera (1) and a laser (2), designed and responsible for digitalisation of the image; all of this is solidly coupled to a chassis (3) capable of rotating on its own axis, and protected by a case.

The indexed rotating mechanism is formed essentially of at least two motors, one main one (14) and a secondary one (6); an encoder (7) and a locking and/or coupling system.

The principal motor (14) is responsible for rotating the whole, by means of the rotating motor (5), around the rotating axis (4), which houses the secondary motor (6) responsible for locking the system at each angular position.

The principal motor (14) incorporates an encoder (7) on its axis, the function of which is to control its exact position; and a set of gears (11) which allow it to rotate in relation to the rotating axis (4).

With the locking system released, the sensor is rotated using the principal motor (14) until the selected position detected using the encoder (7). The locking system is responsible for correct and accurate positioning of the sensor.

The secondary motorised element (6) comprises in its upper part a locking motor (8) housed in a first external support (9), in which the lower part houses locking rollers (10) inserted in a second support (12). And finally it incorporates a ring (13) inside, which is coupled to the first external support (9) using a retaining stud, converting the rotating movement of the motor into a linear movement which allows the rotating axis (4) to be released or locked.

The locking is produced by contact between balls housed in the chassis (3) and the rollers (10) adjacent to the lower part of the first support (9), as rotation of the locking motor (8) together with the ring (13) causes the set of rollers (10) to rise, exercising sufficient pressure to maintain contact with the balls and lock the position. The geometrical form of these elements means that contact occurs at a specific point which is always the same, thereby achieving optimum repeatability. By controlling the number of balls and the number of pairs of rollers arranged in a radial position, the number of angular positions the system may adopt can be determined.

Coupled to the upper part of the rotating axis (4) is a connector configured for connection of the system with the head of the machine or arm which handles a digitalisation system, distributing and redirecting the signals from the outside, and for the electronic control of the whole system.

The sensor presented here incorporates electronic media in the form of control boards or electronic circuits, installed inside the case to exercise control over the encoder (7) and the remaining elements which can be controlled, such as motors (5,8), laser (2) and camera (1).

In a practical, though not restrictive, embodiment, the sensor advocated here will incorporate a system for monitoring the temperature and/or a system for monitoring energy consumption, the purpose of which, in both cases, will be to guarantee correct operation of the system.

The electronic media use a series of commands to control and ensure the movement and the position of the system and the scanning of the parts. The phases for movement of the system are: activation of the secondary motor (6) to release the axis, activation of the principal motor (14) for rotation of the sensor to the desired position, controlled using the encoder (7) and activation of the secondary motor (6) to lock the axis.

The invention claimed is:

1. Laser sensor with integrated rotating mechanism which comprises: a camera (1); a laser (2); and a chassis (3) configured to rotate on its own axis (4); characterised in that it comprises an indexed rotating mechanism which comprises, in turn: a first motorised set (14), which consists of a first rotating motor (5) positioned on an axis parallel to the rotating axis (4), and connected to said rotating axis (4) by a set of gears (11); and a second motorised set (6) which consists of a second locking motor (8) housed inside the axis (4) in a first support (9); and where the first support (9) comprises at the bottom locking rollers (10) and a ring (13) coupled to the aforementioned first support (9) in such a way that locking occurs as a result of contact between balls housed in the chassis (3) and the rollers (10) adjacent to the lower part of the support (9).

2. The sensor in claim 1, in which the locking rollers (10) are inserted in a second support (12).

3. The sensor in claim 1, in which the ring (13) is coupled to the first support (9) using a retaining stud.

4. The sensor in claim 1, in which a connector is coupled to the upper part of the rotating axis (4), configured for connection with the head of the machine or arm.

5. The sensor according to claim 1, which incorporates a system for monitoring the temperature.

6. The sensor according to claim 1, which incorporates a system for monitoring the energy consumption.

7. The sensor according to claim 1, which incorporates an electronic control configured to activate the secondary motorised element (6) to release the axis (4); activation of the principal motor (14) for rotation of the sensor to the desired position; control of the encoder (7); and activation of the secondary motor (6) to lock the axis (4).

* * * * *